United States Patent Office 2,696,157
Patented Dec. 7, 1954

2,696,157

METHOD OF PREPARING QUICK-COOKING RICE

Harold A. Campbell, Denville, and Frank Hollis, Jr., Weehawken, N. J., assignors to General Foods Corporation, New York, N. Y., a corporation of Delaware No Drawing. Application April 5, 1951,
Serial No. 219,514

8 Claims. (Cl. 99—80)

This invention relates to improvements in quick cooking dry rice.

Raw rice is sometimes marketed without removal of its bran coat as brown rice, but more often the bran coat is removed by milling to form the usual white or milled rice of commerce. In both cases the rice grains are hard, dense and opaque and consist largely of raw starch having a moisture content of about 8–14%. During cooking of such rice, the starch is gelatinized and the moisture content of the grains increases to about 65–80%, the grains swelling to several times their original size and becoming soft and palatable. In order to make sure that the starch in the centers of the grains is properly cooked, however, relatively long cooking is required with the result that the starch at the grain surfaces becomes overcooked and the starch granules burst, discharging a sticky pasty liquid. The surfaces of the grains are then pasty and unpalatable unless the starch paste is washed off with a resulting loss of nutritive constituents which may amount to as much as 25% by weight of the rice. In order to avoid this undesirable surface overcooking, the cooking period must be shortened so much that the centers of the grains are somewhat undercooked and tough and chewy. Even in this case, moreover, undesirably long cooking times are required.

The principal object of the present invention is to provide an improved process for treating raw rice so that moisture can penetrate relatively rapidly to the interior of the grain during cooking. Thus the grains can be cooked uniformly throughout to render them soft and palatable at the center without surface pastiness, and at the same time the cooking period can be substantially shortened.

It has been found that when raw rice grains are subjected to radiant heating by exposing them to a suitable source of infrared radiation, numerous small cracks or fissures are produced which extend inwardly from the surfaces of the grain. As a result, when the treated grains are subsequently cooked, moisture penetrates rapidly to the interior of each grain through the cracks or fissures, and the grain centers are cooked to the desired soft palatable condition without any substantial amount of surface overcooking in a period only about half as long as that required to cook the untreated raw rice.

The exact explanation for the production of the aforesaid cracks or fissures is uncertain. They may be due in part to the fact that the rice grain is not homogeneous so that various sections thereof may have different coefficients of expansion and unequal expansion may cause cracking. On the other hand, the surface portions or layers of the grains that are exposed to the infrared radiation heat up very rapidly, whereas transmission of heat therefrom through the rice grains to their interiors takes place more slowly. The resultant uneven heating of the grains from the outer to the inner sections also tends to cause unequal expansion and cracking.

The treated grains closely resemble raw rice on casual observation, the individual grains having approximately the same size, shape and appearance as the untreated grains. On closer examination, however, and especially when the treated grains are viewed under the microscope, the cracks or fissures are readily apparent and the grains have a segmented appearance. The treated rice may be cooked in the same manner as the raw rice, but in about half the time, and the resulting product is uniformly cooked and soft and palatable throughout.

In treating the raw rice, any desired procedure can be used whereby the individual grains are exposed to the infrared radiation for a short period. Within wide limits of intensity of radiation, heating takes place so rapidly that the rate of heating is approximately the same in all cases and hence cannot serve as a control factor. The only outward manifestation of the extent of heating that can be used practicably for control purposes is the final surface temperature of the rice grains. Insufficient heating, as manifested by too low a final temperature, will not produce sufficient cracking or fissuring to effect the desired improvement in the cooking properties of the rice. Excessive heating, as manifested by too high a final temperature, results in undue breakage of the grains. Hence the period of heating should be correlated with the intensity of the radiation to produce the proper surface temperature of the rice. It has been found that the temperature limits to be observed vary according to the moisture content of the raw rice. At a normal moisture content of around 10%, the final temperature of the rice should be between 170° F. and 250° F. At a moisture level of 18%, which is about the maximum for the present process, the final rice temperature should be between 130° F. and 220° F. Drier rice can also be treated. At 6% moisture, which is about the minimum for the present process, the final rice temperature should be between 190° F. and 260° F. As a rule, commercial rice has a moisture content in the range of 10–14% and is well suited for treatment by the present process. Of course, such rice may be further dried before treatment, but no practical advantage is gained thereby.

In practice, the rice grains are preferably passed under the infrared generator or generators in a moving stream or layer, the speed of movement of the rice being correlated with the intensity of the radiation to provide the desired final surface temperature. In order to insure uniform results, the grains are preferably exposed in a layer that is only about one grain thick and at the same time are agitated to cause overturning or rotation of the grains, care being also taken to maintain approximately uniform intensity of radiation over the entire exposed area of the rice bed or layer. The intensity of the radiation at the surface of the bed depends, of course, on the intensity at the source and on the distance of the source from the bed.

By way of example, the rice is irradiated in a Jeffrey Vibrator-Feeder lined with a stainless steel trough 3" wide and 29" long. The action of the vibrator causes the grains to move along the trough in a bed, sheet or layer and at the same time to rotate about their axes. The grain is fed continuously to the feed end of the vibrator at a rate such that the moving bed or layer is approximately one grain thick. Four 250 watt infrared lamps with built-in reflectors are aligned along the trough, facing downward at a distance of about 18" from the moving rice bed to provide the desired infrared radiation. These conditions afford substantially uniform exposure of grain surface to the radiation.

As an example of the use of the above apparatus, raw white rice having a moisture content of 9.8% was passed through the vibrator three times in succession, each pass requiring 17 seconds so that the total time of exposure was 51 seconds. At the end of the third pass, the surface temperature of the rice was 208° F. as determined by a probing type pyrometer, and numerous cracks or fissures had developed in the grains as described above. 40 grams of the fissured rice was cooked for 9 minutes in 5 cups of boiling water to produce an evenly cooked rice of good texture.

The process set forth above can also be combined very advantageously with the process of preparing quick cooking rice that is disclosed and claimed in U. S. Patent No. 2,438,939. This prior process, briefly summarized, comprises precooking rice grains to increase their moisture content to 65–70%, and then drying the swollen grains rapidly to set them in their enlarged size and to produce a porous structure so that rehydration of the dried product takes place rapidly on final cooking by the consumer. In the precooking operation, it is desirable to avoid surface overcooking in order to keep the grains from sticking together during the subsequent drying operation, as well as to maintain the quality of the product and to avoid undue losses, and hence in the preferred operation of the prior process the centers of the grains usually are not completely gelatinized. In consequence, a minimum rehydration or final cooking period of 2–3 minutes is required and the centers of the grains tend to be rather firm and somewhat chewy, a condition preferred by many consumers but considered undesirable by others. As explained hereinafter, these difficulties of the prior process can be largely if not completely eliminated, and furthermore an improved product can be obtained, by combining the radiant heating method described above with precooking and drying steps similar to those described in the aforesaid patent.

In the prior process it is preferred to soak the raw rice prior to precooking in order to facilitate the precooking operation and to promote the formation of voids in the dried product. When the rice is first cracked or fissured by radiant heating, however, substantially uniform and complete gelatinization can be effected during precooking without preliminary soaking. Hence soaking is unnecessary and in fact is undesirable when the rice is precooked by immersion in hot or boiling water because it leads to the production of an undesirable soft, soggy product. On the other hand, when the rice is precooked by steaming, some preliminary soaking is advantageous to distribute moisture substantially uniformly throughout the rice grain, but the average soaking time may be decreased as much as 50% as compared with the prior process and yet the average water imbibition may be increased from 30% to about 45%.

Whether the cracked rice is precooked by immersion in boiling water or by steaming, gelatinization takes place uniformly throughout the grain and practically complete gelatinization can be effected without danger of surface overcooking with its consequent undesirable characteristics of pastiness and loss of solids. Thus the water uptake of the rice can advantageously be increased beyond that preferred in the prior process, the moisture content of the precooked rice preferably being at least 70–75%. Accordingly the volume of the precooked rice is about 10% greater than that resulting from the preferred practice of the prior process, and the final product obtained on drying this bulkier rice has improved properties upon reconstitution as will be pointed out hereinafter. A further important advantage is that the aforesaid more complete cooking may be carried out in substantialy less time than that previously required; for example, complete gelatinization can be obtained by cooking in boiling water for about 10 minutes without preliminary soaking, as compared with 12–14 minutes usually required even after thorough soaking.

After precooking it is usually desirable to cool the rice to prevent further gelatinization as disclosed in the aforesaid patent, either by exposing the precooked rice to a blast of cold air or preferably by immersing it in cold water. The latter method has the additional advantage of washing any foreign material from the cooked rice, and since there is little or no surface overcooking, no appreciable quantity of soluble solids is removed by such washing.

After the precooked rice has been cooled, it is next subjected to rapid drying which, as described in the aforesaid patent, removes moisture from the surfaces of the grains at a rate sufficiently faster than it can diffuse thereto from their interiors as to set them in their enlarged condition and produce a porous structure therein. As a result of preliminary cracking or fissuring, however, rice dries at a much faster rate. Using apparatus similar to that described in the prior patent, the fissured rice can be dried satisfactorily in about two thirds of the time needed for rice which is not fissured. This results from the fact that the rice grains are bulkier as explained above and hence have greater surface area from which moisture can be removed, and from the further fact that said fissures provide additional exits to remove the water from the centers of the grains to their surfaces. Moreover, because of the greater bulk of the precooked grains and the more rapid drying thereof, the dried product is bulkier and fluffier than similar products heretofore produced, being 15 to 50% greater in bulk than that obtained in the preferred operation of the prior process.

Best drying results are obtained by spreading the moist rice on a supporting screen and blowing relatively dry heated air upward through the rice, whereby the grains are agitated and separated to prevent matting and to insure thorough air circulation around each grain. With appropriate air velocity and humidity, drying may be carried out at room temperature but it is usually preferable to accelerate drying by heating the air, temperatures greater than about 140° C. being avoided to prevent scorching of the rice. In most cases it is sufficient to dry the rice to about 8 to 14% moisture, but if desired, such rice may be dried to a lower figure.

As a result of its greater size, substantially uniform and complete gelatinization, and greater porosity, the quick cooking dry rice prepared in the above manner is superior upon rehydration to any such product prepared heretofore. In particular, the rice is quicker cooking, requiring as little as 2 minutes in many cases, but the rehydrated or cooked rice also has greater bulk volume and is fluffier and as a result more palatable than similar products heretofore produced; it is also less pasty and substantially devoid of tough, chewy centers; furthermore, upon rehydration or final cooking the product takes up a greater volume of water and its moisture content closely approaches that of the precooked rice prior to drying.

As an example of the combined process set forth above, the cracked or fissured rice of the example set forth above is passed into a continuous cooker comprising a rotary reel of the pea blancher type, in which the rice is precooked in water at a temperature of about 260° F. for 10 minutes. At the end of this time the rice is uniformly and almost completely gelatinized and has a moisture content of 72%.

The rice is then discharged into a whirlpool type washer supplied with cold water entering at 60° F. and is cooled to about 76° F. in about 2 minutes. This washing also removes any foreign material present in the rice.

The cooled washed rice is then flumed onto a wire screen conveyor belt to drain off excess water, being placed on the belt in a 3 inch layer and allowed to drain 4 or 5 minutes.

The drained rice is then deposited on a continuous conveyor drier belt passing through a forced draft drier 50 feet in length and 8 feet in width. The layer of rice is about 1 inch thick and air is forced upwardly and downwardly through the rice bed at an air inlet temperature of 250° F. and an air velocity of 175 feet per minute. The rice passes through the drier in 20 minutes and its moisture content is reduced to 11%.

One hundred forty-two grams of the dried rice is reconstituted by pouring 475 ml. of boiling water thereon. After allowing 5 minutes of standing, the rice is rehydrated to provide a soft, non-pasty, substantially uniformly gelatinized cooked rice having a moisture content of 72%.

It will be understood that the invention is not restricted to the details of the foregoing description nor to the examples particularly set forth therein, and that reference should be had to the appended claims for a definition of its limits.

What is claimed is:

1. A process of preparing a quick cooking dry rice which comprises subjecting unbroken raw rice grains to infrared radiation to provide said rice grains with fissures, then subjecting the fissured rice grains to moisture and heat to gelatinize the starch and cause the grains to soften and swell substantially beyond their original size, and then drying the swollen grains by removing moisture from their surfaces at a rate sufficiently faster than it can diffuse thereto from their interiors as to set them in their enlarged condition and produce a porous structure therein.

2. A process of preparing a quick cooking dry rice which comprises subjecting unbroken raw rice grains to infrared radiation to provide said rice grains with fissures, then subjecting the fissured rice grains to moisture and heat to gelatinize the starch and increase the moisture content of the grains to at least about 70–75% with substantial swelling of the grains, and then drying the swollen grains by removing moisture from their surfaces at a rate sufficiently faster than it can diffuse thereto from their interiors as to set them in their enlarged condition and produce a porous structure therein.

3. A process of preparing a quick cooking dry rice which comprises subjecting unbroken raw rice grains to infrared radiation to provide said rice grains with fissures, then cooking the fissured rice grains in water to gelatinize the starch and raise its moisture content to at least about 70–75% with substantial swelling of the grain, then cooling the grains to prevent further gelatinization of the starch, and then drying the swollen grains by removing moisture from their surfaces at a rate sufficiently faster than it can diffuse thereto from their interiors as to set them in their enlarged condition and produce a porous structure therein.

4. A process of preparing a quick cooking dry rice which comprises subjecting unbroken raw rice grains to infrared radiation to provide said rice grains with fissures, then cooking the fissured rice grains in water to gelatinize the starch and raise its moisture content to at least about 70–75% with concomitant substantial swelling of the grain, and then drying the grains by circulating heated air through the grains to remove moisture from their surfaces at a rate sufficiently faster than it can diffuse thereto from their interiors as to set them in their enlarged condition and produce a porous structure therein.

5. The method of producing quick cooking rice which comprises subjecting unbroken raw rice grains containing 6–18% moisture to infrared radiation to raise the surface temperature of the grains to a value within the range of 130° F. to 260° F., then subjecting the treated grains to the action of moisture and heat to gelatinize the starch with concomitant substantial swelling of the grains, and then drying the swollen grains by removing moisture from their surfaces at a rate sufficiently faster than it can diffuse thereto from their interiors as to set the grains in their enlarged condition and produce a porous structure therein.

6. The method of claim 5 wherein the gelatinized grains are cooled before being dried.

7. The method of claim 5 wherein the grains are dried by circulating heated air therethrough.

8. The method of claim 5 wherein the grains are cooked in water to gelatinize the starch and increase the moisture content of the grains to at least 70–75%.

References Cited in the file of this patent

UNITED STATES PATENTS

| Number | Name | Date |
|---|---|---|
| 1,094,197 | Davis | Apr. 21, 1914 |
| 1,850,123 | Anderson | Mar. 22, 1932 |
| 2,428,090 | Naeher et al. | Sept. 30, 1947 |
| 2,438,939 | Ozai-Durrani | Apr. 6, 1948 |

FOREIGN PATENTS

| Number | Country | Date |
|---|---|---|
| 578,614 | Great Britain | July 4, 1946 |